United States Patent [19]
Morton

[11] 3,965,871
[45] June 29, 1976

[54] CONVERTER VAPORIZER

[76] Inventor: Clyde M. Morton, 11525 S. Ramona, Hawthorn, Calif. 90250

[22] Filed: Mar. 22, 1974

[21] Appl. No.: 453,590

[52] U.S. Cl. ............................. 123/25 B; 123/25 L
[51] Int. Cl. ............................................ F02d 19/00
[58] Field of Search ............... 123/25 B, 25 D, 25 J, 123/25 L, 25 P, 34 A, 122 A, 122 AG, 25 R

[56] References Cited
UNITED STATES PATENTS

| | | | |
|---|---|---|---|
| 1,504,018 | 8/1924 | Berard | 123/25 B |
| 1,511,493 | 10/1924 | Barnum | 123/25 B |
| 1,550,967 | 8/1925 | Kelty | 123/25 B |
| 1,611,530 | 12/1926 | Judia | 123/25 B X |
| 1,784,831 | 12/1930 | Funalman | 123/25 B |
| 1,981,891 | 11/1934 | Woermann | 123/25 B X |
| 1,983,971 | 12/1934 | Doherty | 123/25 B X |
| 3,537,434 | 11/1970 | Herpin | 123/25 L |
| 3,640,254 | 2/1972 | Manfredi | 123/25 B X |

*Primary Examiner*—Charles J. Myhre
*Assistant Examiner*—Ira S. Lazarus

[57] ABSTRACT

For introducing water in vapor form to the intake manifold of a combustion engine use is made of a double walled heat exchanger. Exhaust from the engine is passed through the space between an inner wall and an outer wall and then returned to the exhaust pipe. A chamber within the inner wall provides a reservoir of water and accommodates a float to control the level. For transporting vapors to the intake manifold of a combustion engine, a vacuum line from the intake manifold is in communication with the chamber at a location above the water level and induces air to flow through an air intake to a location adjacent the bottom of the water reservoir, releasing large bubbles of air below a dispersing plate through which a plurality of streams of small bubbles emerge bubbling to the surface, and entrain hot water vapor. The mixture of water vapor is then carried upwardly by the vacuum through a set of fine screens and then through to the engine intake manifold at a location adjacent the fuel air mixture passage at the outflow end of the carburetor.

14 Claims, 9 Drawing Figures

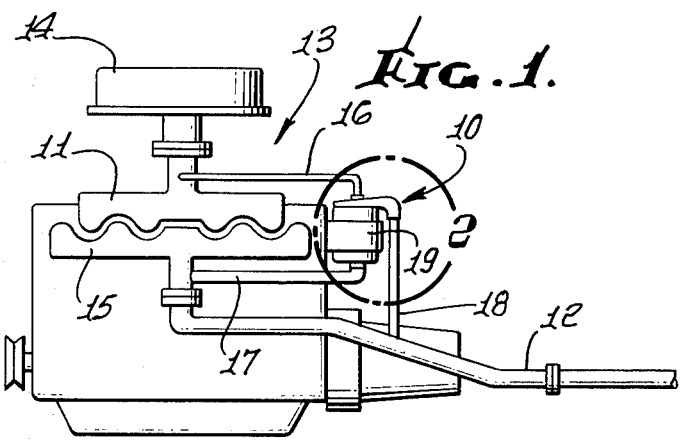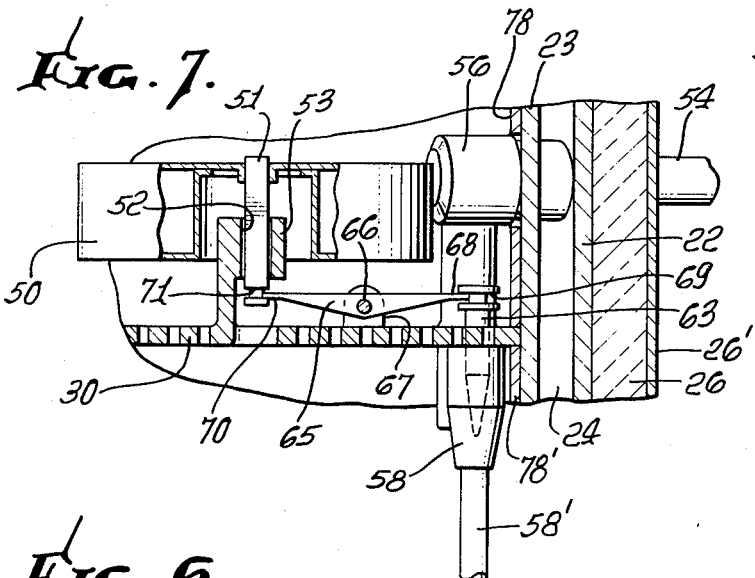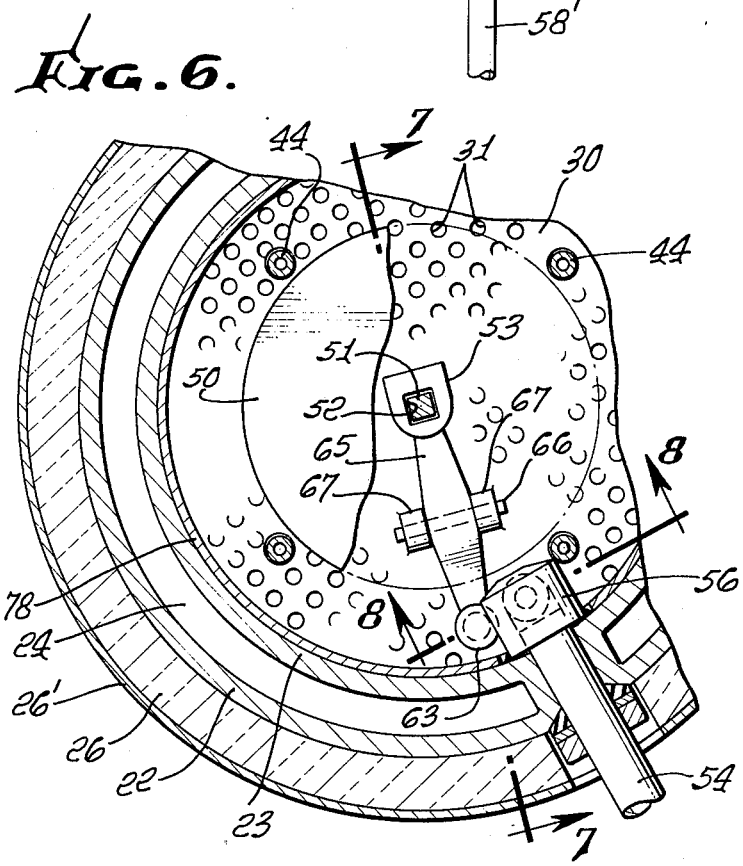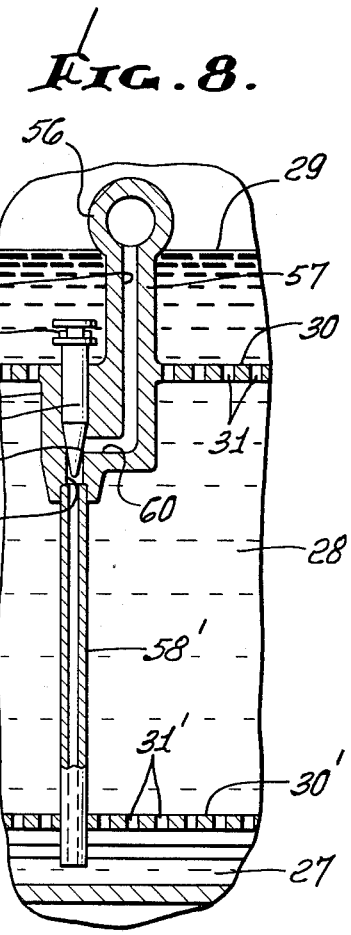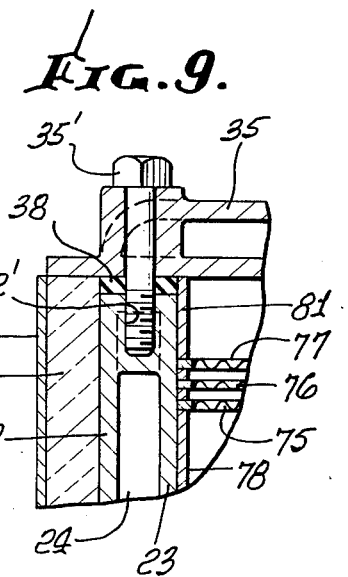

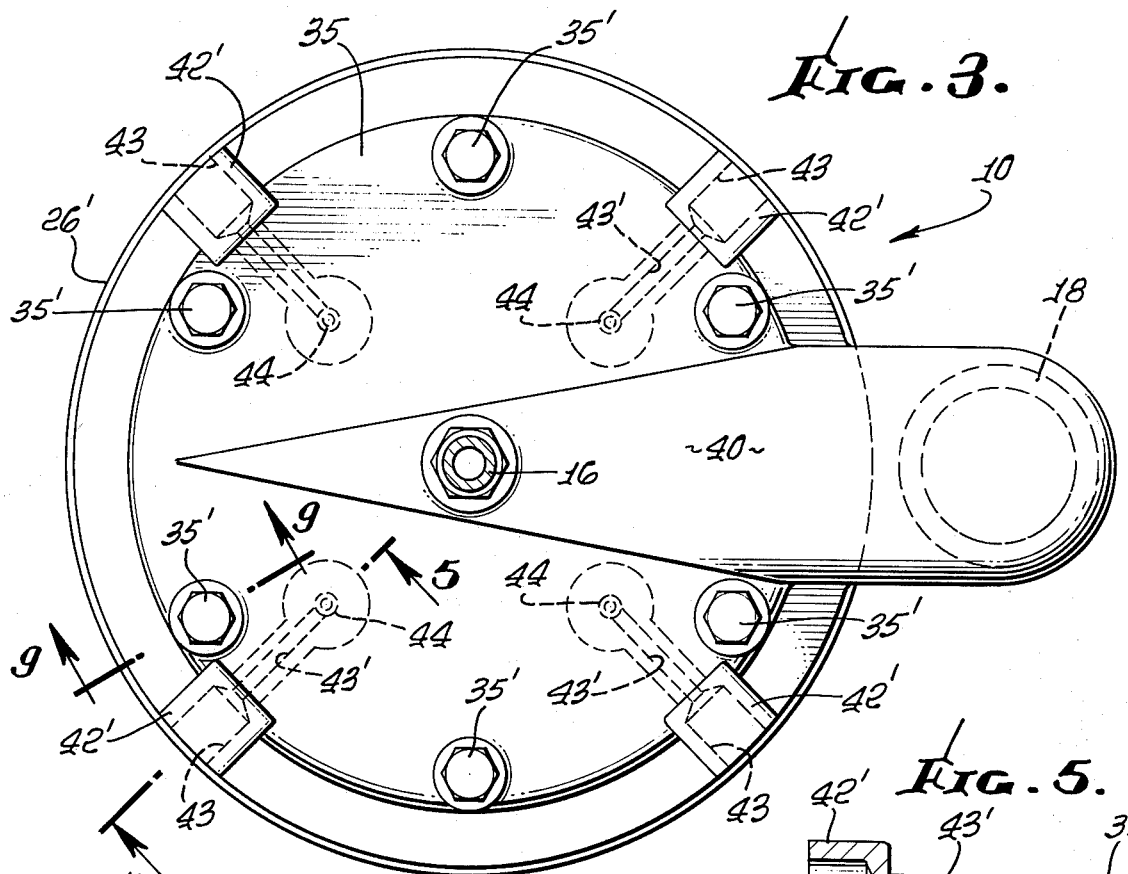
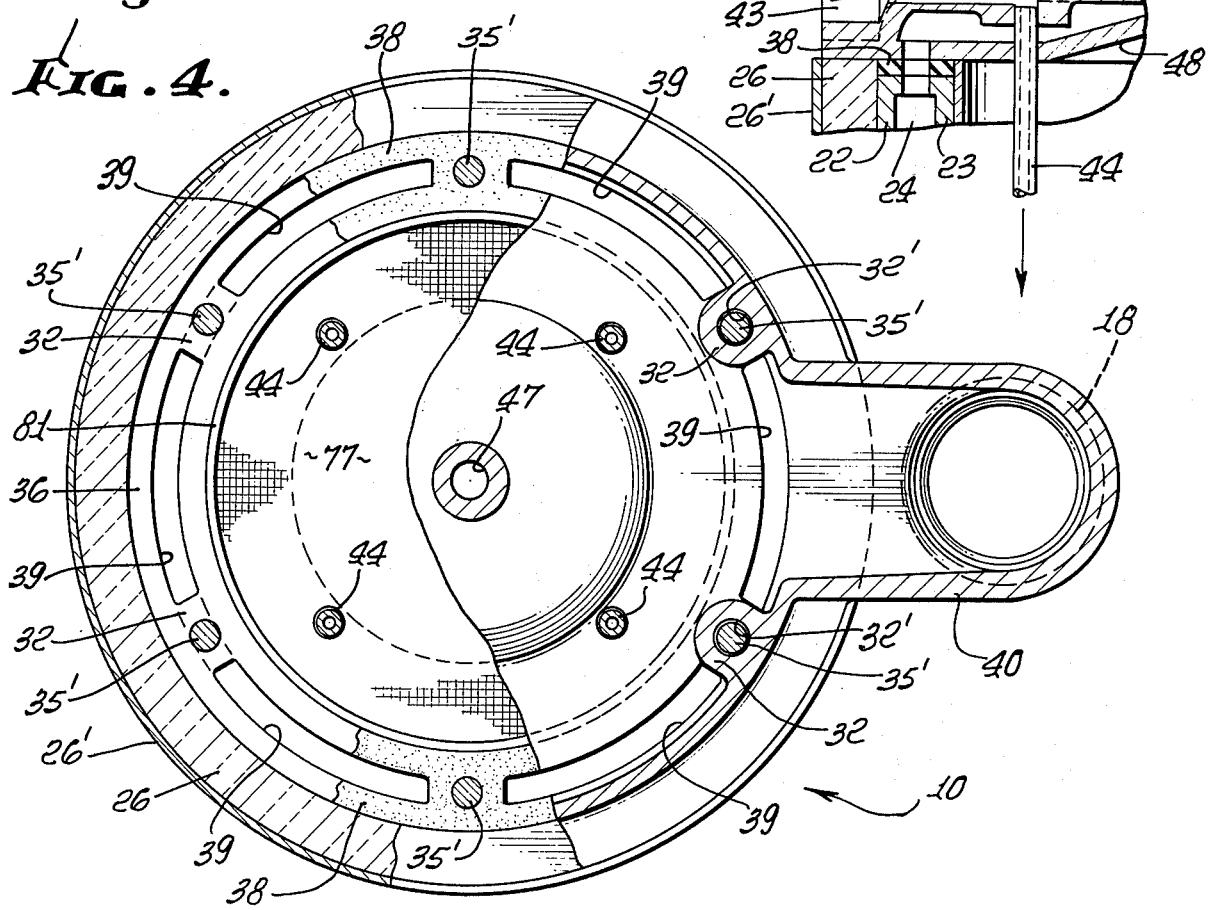

CONVERTER VAPORIZER

It has heretofore been recognized that there can be an advantage in the performance of a combustion engine when there is present in the fuel an acceptable amount of water vapor. Understandably, inclusion of indiscriminate amounts of water in gasoline for such a purpose is unacceptable and generally unworkable. To make use of water some expedient becomes necessary to present the water, which is the greatest source of hydrogen and oxygen, in an acceptable form to the fuel supply, to implement the starved condition that has always been and now is prevalent in the conventional internal combustion engine. To accomplish this it is important to introduce the water as water vapor, and to introduce the vapor to implement a starved condition in the fuel supply and in a quantity which bears a specific relationship to the engine's demand for fuel.

It is therefore among the objects of the invention to provide a new and improved device for collecting water vapor, mixing it with an adequate amount of auxiliary air and then delivering it to the conventional fuel-air intake of the combustion engine.

Another object of the invention is to provide a new and improved device which is capable of making use of the heat present in a combustion engine exhaust system to vaporize a measured amount of water to be mixed with an adequate amount of auxiliary air and to deliver the mixture in a form acceptable for mixing with the fuel-air output of a conventional carburetor.

Another object of the invention is to provide a new and improved converter vaporizer for water vapor which is small and compact to an extent making it economically feasible and mechanically capable of being installed at an appropriate location with respect to a combustion engine, the device being one which is efficient in its operation, made so by use of the heating capabilities of the engine exhaust system and also one tied into engine performance by a vacuum line connection to the intake manifold whereby the delivery of a mixture of air and water vapor to the fuel-air intake of the combustion engine is directly related to engine requirements.

With these and other objects in view, the invention consists in the construction, arrangement, and combination of the various parts of the device, whereby the objects contemplated are attained, as hereinafter set forth, pointed out in the appended claims and illustrated in the accompanying drawings.

FIG. 1 is a side elevational view showing a conventional combustion engine and the location of the converter vaporizer with respect thereto.

FIG. 3 is a plan view on the line 3—3 of FIG. 2.

FIG. 4 is a cross-sectional view on the line 4—4 of FIG. 2.

FIG. 5 is a fragmentary longitudinal sectional view taken on the line 5—5 of FIG. 3.

FIG. 6 is a cross-sectional view taken on the line 6—6 of FIG. 2.

FIG. 7 is a fragmentary longitudinal sectional view on the line 7—7 of FIG. 6.

FIG. 8 is a frangmentary longitudinal sectional view on the line 8—8 of FIG. 6.

FIG. 9 is a fragmentary sectional view on the line 9—9 of FIG. 3.

Figure 2:
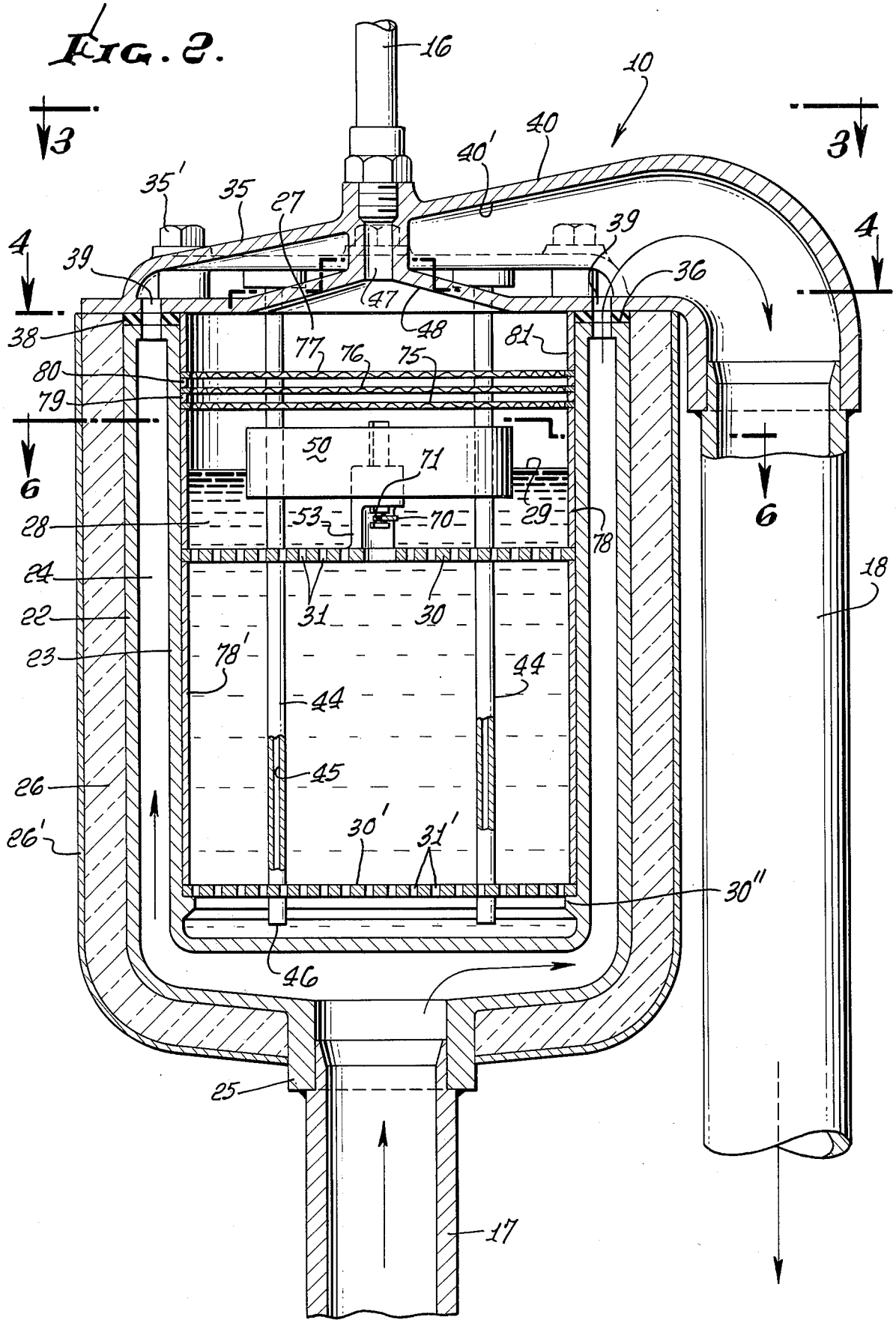
FIG. 2 is a vertical sectional view of the device.

In an embodiment of the invention chosen for the purpose of illustration a heat exchanger indicated generally by the reference character 10 is shown located generally intermediate an intake manifold 11 and an exhaust pipe 12 of a conventional combustion engine 13. The engine 13 is shown as being equipped with a conventional air cleaner 14. An exhaust manifold 15 communicates with the exhaust pipe 12.

The heat exchanger 10 is shown connected by means of a vacuum line 16 to the intake manifold 11 and connected by means of an exhaust line 17 to the exhaust pipe at a location adjacent the exhaust manifold. An exhaust discharge line 18 communicates with the exhaust pipe 12 at a location downstream relative to the connection of the exhaust line 17 to the exhaust pipe. A suitable bracket 19 is employed for mounting the heat exchanger in position.

For details of the heat exchanger 10 reference is made to drawing FIG. 1 and FIG. 2, wherein there is shown a cylindrical outer wall 22 and an inner cylindrical wall 23 in nested relationship and in spaced relationship forming a cylindrical vein 24. The lower end of the inner cylindrical wall 23 forms a horizontal flat floor for a cylindrical reservoir 27, for water supply 28. The lower end of the cylindrical outer wall 22 joins the floor of the reservoir 27, thus widening the vein 24 and forming a cylindrical boss 25 which communicates with the exhaust inflow pipe 17. Communication is thus established with the exhaust manifold 15, shown in drawing FIG. 1, allowing free passage of engine exhaust up and through the vein 24 to the top end of the walls 22 and 23 where walls 22 and 23 are connected by means of six bosses 32, FIG. 4, forming a flat surface 36, shown in FIGS. 5 and 2, for a gasket 38. The tops of walls 22 and 23 and the six bosses 32 provide six arcuate slots 39, and in the six bosses 32 are six threaded holes 32' for capscrews 35' which hold a cover 35 in place. The gasket 38 is beneath the cover and six matching arcuate slots 39 are provided through which the engine exhaust continues to pass unobstructed into a cover housing 40 forming a chamber 40' through which the engine exhaust is diverted downwardly into the exhaust discharge line 18 back into engine exhaust pipe 12 shown in drawing FIG. 1.

A layer 26 of insulation surrounds the circumference of the outer side of the outside wall 22 from lower boss 25 to the top of wall 22 to cover 35. If desired the insulation may be incased with a thin formed sheet metal jacket, 26'.

The cylindrical inner wall 23 in FIG. 2 provides a chamber 27 which is adapted to contain a body of water 28 to a depth providing a liquid level 29. Intermediate the top and the bottom of the chamber 27 is a casting 30 forming a support partition through which perforations 31 extend, in order that heated air and water vapors may pass freely through the partition. Said partition is supported by an upper end of a sleeve 78' which extends downward and communicates with the top outer edge of a dispersing plate 30' adjacent the bottom of chamber 27 and which rests on a ledge 30" that projects inwardly from the wall 23.

The dispersing plate 30' provides dispersing means whereby the large bubbles of air from pipes 44, FIG. 2, below said dispersing plate 30' having a plurality of small perforations 31', emerge as tiny streams of air bubbles which gather moist water vapors as they continue to rise, finally passing through perforations 31 of supporting partition casting 30 through which the bubbles of moisture laden air freely pass to the liquid surface 29 where the air bubbles absorb an abundance of the surging moist gas vapors that pass upward through a series of baffle and defusing screens into a vacuum port 47 and on into a vacuum line 16 to intake manifold 15 as shown in FIG. 1.

By creating a supply of hot moist water vapor the oxygen and hydrogen of the water is made more readily usable in the combustion cycle of the engine.

Extending around the circumference of the cover 35 is a series of four bosses 42' shown in FIGS. 3 and 5, the bosses providing airport inlets 43 supplying passages 43'. Each air passage 43' communicates with a downwardly extending pipe 44 such that a bore 45 through the pipe has an outlet opening 46 adjacent the bottom of the chamber 27.

A vacuum port 47 at the center of the cover 35 shown in FIG. 2 communicates with a recess 48 whereby that portion of the chamber 27 above the liquid level 29 can be subjected to a vacuum condition.

For maintaining a desired water level 29 shown in FIG. 2 in the chamber 27 use is made of a float 50. The float is provided with a stem 51 which extends slidably through a hole 52 in a bracket 53, the bracket being located on, and for convenience being part of, the casting 30 forming a support partition as shown advantageously in FIG. 7.

To keep the chamber 27 supplied with water 28 shown in FIG. 2 there is a water supply line 54 shown in FIG. 7 which may be connected to a suitable source of water. The inner end of the water supply line threads into a boss 56 that is integral with neck 57, in turn integral with casting 30 forming a support partition. Neck 58 protrudes downward communicating with a water outlet pipe 58' extending downward to a location adjacent the bottom of the chamber 27.

A vertical bore 59 in the neck 57 shown in FIG. 8 communicates with a horizontal bore 60 and the horizontal bore in turn communicates with a second vertical bore 61 and in that way to the outlet pipe 58'. At the junction of the horizontal bore 60 and second vertical bore 61 is a valve seat 62 on which seats a needle valve element 63 whereby the flow of water through the water intake pipe can be controlled.

As shown in FIGS. 6 and 7 there is a rocker arm 65 pivotally mounted by means of a pin 66 on a bracket 67, the bracket 67 being integral with casting 30. One end 68 of the rocker arm is in engagement with an annular recess 69 on the upper end of the needle valve element 63. The other end 70 is in engagement with an annular recess 71 on the lower end of the float stem 51.

Accordingly when the liquid level 29 shown in FIGS. 8 and 2 commences to lower causing the float 50 to move downwardly action of the float 50 and its stem 51 downwardly on the respective end of the rocker arm 65 causes the opposite end of the rocker arm to lift whereby to unseat the needle valve element 63 from the valve seat 62 thereby admitting more water to the chamber 27 shown in FIGS. 8 and 2.

Conversely, when the liquid level 29 commences to rise the float 50 will move upwardly causing the rocker arm 65 to rotate in a clockwise direction as viewed in FIG. 7. The result of this is to induce downward movement of the needle valve element 63 whereby to close the valve element on the valve seat 62 thereby to diminish or if need be completely stop the supply of water to the reservoir 27.

For improved performance of the device a baffle action is most important for preventing the agitated liquid surface if or when boiling from bubbling up and /or spewing up into vacuum port 47 above screen 77. Other very important features are the dispersing and defusing effect accomplished by the set of three very fine screens 75, 76 and 77 shown in FIG. 2 producing a smooth textured, moist gaseous vapor, said screens being mounted in vertically spaced relationship one above the other and all being located at a substantial distance from the top of the float 50 in its uppermost position. To position and space said screens 75, 76, and 77 and supporting casting 30 and dispersing plate 30', sleeves are employed to respectively separate the screens and partitions in their individually mounted positions. The top end of sleeve 81 communicates with the under side of cover 35 extending down to screen 77. Screens 77, 76 and 75 are respectively separated by sleeves 80 and 79. The underside of screen 75 communicates with the top end of sleeve 78 which extends down to the upper edge of the casting forming supporting partition 30, the underside of which communicates with and is supported by the upper end of sleeve 78' which extends downward to the upper outer edge of dispersing plate 31'. The under periphery outer edge of plate 31' rests on a ledge 30" projecting inwardly from wall 23 which forms the cylindrical reservoir namely chamber 27 of the heat exchanger, said ledge being adjacent the bottom of chamber 27.

Said screens 75, 76 and 77 shown in FIG. 2, preferably of copper, are hemmed with strips of hard copper, with the hem crimped for securing the assembly without precision machining. The structure defined creates a sponge effect that will firmly squeeze the assembly. When assembled the upper end of a sleeve 81 will project above top of gasket 38. The gasket lying in place on surface 36, the heat exchanger cover 35 is positioned on projecting sleeve 81, and as capscrews 35' are tightened, press sleeve 77 down, firmly squeezing the assembly and gasket 38 simultaneously in one operation.

In operation hot engine exhaust flows through the exhaust line 17 on up into vein 24 of heat exchanger formed by walls 22 and 23, heat penetrating wall 23 and heating water 28 in chamber 27, the water 28 in chamber 27 having been initially provided. The heating operation commences when the combustion engine is started.

At the same time, and with the engine running, a vacuum is created in the intake manifold of the engine by conventional means. This vacuum condition is communicated to the space in the heat chamber which is above the liquid level 29 shown in FIG. 2. The vacuum condition induces inflow of air into the air inlet ports 43 shown in FIG. 3 through passages 43' and down through pipes 44, the air emerging from the outlets 46 below dispersing plate 31' at the bottom of heat chamber 27 shown in FIG. 2. Large bubbles of air spreading over the under periphery of plate 31' emerges in a plurality of tiny streams of bubbles, bubbling up through the body of water 28 which has become heated by the engine exhaust emissions.

The air thus introduced in said plurality of small streams of bubbles emerging from plate 30' bubbles up through the hot water gathering moist vapors as they proceed through perforations in supporting partition casting 30 and emerging bubbling to the liquid surface 29 where the moisture ladened air gathers a much greater amount of water vapors. Inasmuch as the water 28 has been heated in a chamber 27 subject to a vacuum condition, water will readily vaporize at the water level 29 thereby furnishing an abundance of water vapors. Air bubbles emerging from the liquid surface 29 act as a transportation means, picking up the moist gaseous vapors, and by means of vacuum these are carried up through the screens 75, 76 and 77 shown in FIG. 2 where, by reason of the very fine mesh of the screens, the particles forming the gaseous mixture are abundantly dispersed so that there is a smooth textured mixture of water gases. The air which serves as a transportation medium carries the gaseous vapor outwardly by means of vacuum, to the vacuum port 47 and vacuum line 16 to a location directly below the carburetor, the mixture entering the manifold adjacent the outflow of the carburetor; thereby delivering the water vapors, and returning the air previously robbed from the carburetor air-fuel mixture, by using a portion of the intake manifold vacuum. The said moist water gaseous vapors and the returned robbed air are mixed with the outflow of the carburetor air-fuel, thereby forming a more volatile mixture of gases flowing through the intake manifold to the engine and creating a greater agitation in the engine's firing chamber, and consequently a more complete burning of fuel.

As water in the chamber 27 shown in FIG. 2 gets used, thereby lowering the liquid level 29, corresponding lowering of the float by operation on the rocker arm 65 as previously described shown in FIG. 7 opens the valve seat 62 by the lifting of the needle valve element 63 thereby admitting more water into the chamber 27 shown in FIGS. 8 and 2 to maintain the liquid level 29 at all times at about the same level.

As a consequence, as long as the engine is running, and hot exhaust emissions are provided for heating the water 28 in the chamber 27 shown in FIG. 2, there is always provided an abundance of moist water vapors which will be readily transported by the auxiliary outside air being drawn into the system by reason of the vacuum condition, assuring a metered supply of moist gaseous vapors, which will greatly augment the air-fuel mixture provided by the conventional carburetor of a combustion engine.

Introduction of additional moist water vapors will vary, depending upon the vacuum condition created in the intake manifold of the combustion engine under operating conditions, so that the quantity of moist water vapors are automatically controlled.

Having described the invention, what is claimed as new in support of Letters Patent is as follows:

1. In combination with a combustion engine having and an intake manifold an exhaust means from the engine, the combination of a converter vaporizer for converting water into vapor and introducing a mixture of air and the moist gaseous vapors to said combustion engine intake manifold, said converter vaporizer comprising a heat exchanger having respective outer and inner walls in nested relationship and in spaced relationship and forming a vein for engine hot exhaust emissions, a hot exhaust emissions inlet from said exhaust means to said vein and an exhaust emissions outlet from said vein to said exhaust means at a location downstream from said hot emissions inlet, said inner wall forming a cylindrical chamber for water having a top and an inner floor, a water inlet passage to said chamber and a vapor outlet passage from said chamber adjacent the upper end, a flow control in said water inlet passage and bouyant means in said chamber having an operative connection to said flow control, there being a selected liquid level in said chamber determined and maintained by said flow control, an air supply passage means from the exterior of the chamber to a location adjacent to the inner floor of the cylindrical chamber, baffle means in said chamber between said inner floor and said liquid level, a vacuum line communicating between the engine intake manifold and said vapor outlet passage from the chamber, said vapor outlet passage being at a location above said liquid level, and dispersing means in the chamber between said liquid level and said vapor outlet passage forming a dispersing passageway for water vapor particles to said vapor outlet passage for transmission to the engine intake manifold.

2. A converter vaporizer as in claim 1 wherein there is a perforate upper support partition in the cylindrical chamber intermediate the inner floor of the chamber and the liquid level.

3. A converter vaporizer as in claim 1 wherein said baffle means comprises a fine perforate baffle plate in the cylindrical chamber adjacent the inner floor of the chamber.

4. A converter vaporizer as in claim 1 wherein there is a cover for the heat exchanger in sealed relationship with the vein for engine exhaust and with said chamber, said air supply passage menas comprising a plurality of air intake ports in said cover and tubes from respective intake ports extending to locations adjacent the inner floor of the chamber.

5. A converter vaporizer as in claim 1 wherein said dispersing means comprises a plurality of parallel vertically spaced relatively fine mesh screens at locations between the liquid level and the top of the chamber.

6. A converter vaporizer as in claim 2 wherein said flow control is a valve element cooperable with a valve seat, and wherein said bouyant means comprises a float mounted for vertical movement on said support partition and there is a rocker arm in operative engagement respectively with said float and said valve element.

7. A converter vaporizer as in claim 1 wherein said baffle means comprises a plurality of fine separate dispersing plates in the cylindrical chamber comprising means for converting large bubbles of air into a plurality of streams of small bubbles of air.

8. A converter vaporizer as in claim 1 wherein there is a layer of insulation extending over the exterior of said outer wall and thin metal jacket around said insulation.

9. A converter vaporizer as in claim 7 wherein there are shoulders on the inside wall of said chamber comprising supports for the respective dispersing plates.

10. A converter vaporizer as in claim 6 wherein said float is centerably disposed in said chamber in supported condition on said baffle support partition and below said dispersing means.

11. In combination with a combustion engine having, a carburetor, an intake manifold, a combustion chamber, and an exhaust means from the engine, the combination of a converter vaporizer for converting water into hot vapor and introducing a mixture of hot air and moist gaseous steam vapor to said intake manifold, said converter vaporizer comprising a heat exchanger having respective outer and inner walls in nested radially spaced relationship forming a vein for engine hot exhaust emissions, a constantly open hot exhaust emissions inlet from said exhaust means to said vein and a constantly open exhaust emissions outlet from said exhaust means at a location downstream from said inlet, said inner wall forming a cylindrical chamber with part of said chamber serving as a reservoir for water, said chamber having a top wall, a bottom wall and a side wall, a bouyant float in said chamber and valved water supply means in operative association with said float whereby a liquid level is maintained intermediate the top and bottom walls, air supply means to said chamber adjacent the bottom wall, a plurality of vertically spaced perforate air dispersing plates in said chamber below said liquid level, one of said plates being at a location adjacent said bottom wall and another of said dispersing plates being adjacent to and below said liquid level, and a plurality of vertically spaced fine mesh screens in said chamber at locations between said liquid level and said wall, and an outlet port at said top wall communicating with a vacuum line of the intake manifold.

12. The combination of claim 11 wherein there are supporting spacers between said dispersing plates and said screens in vertically aligned relationship adjacent said side wall.

13. The combination of claim 11 wherein the dispersing plates are located between the bottom wall and the float, and the screens are located between the float and the top wall.

14. The combination of claim 12 wherein the top wall comprises a cover having a circumferential edge portion overlying respective upper edges of said outer and inner walls, a gasket between said edge portions and said walls, a sleeve between the top wall and the screen which is most nearly adjacent said top wall, said screen having yieldable reinforced circumferential edges, and fastening means acting between said top wall, and said gasket, said sleeves; said yieldable edges of said screens and said dispersing plates being under pressure exerted by said fastening means whereby to maintain a snug assembled relationship.

* * * * *